United States Patent
Aguilar et al.

(10) Patent No.: US 6,973,447 B1
(45) Date of Patent: Dec. 6, 2005

(54) SYSTEM APPARATUS AND METHOD FOR SUPPORTING MULTIPLE PARTITIONS INCLUDING MULTIPLE SYSTEMS IN BOOT CODE

(75) Inventors: Maximino Aguilar, Austin, TX (US); Sanjay Gupta, Austin, TX (US); James Michael Stafford, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/533,301

(22) Filed: Mar. 23, 2000

(51) Int. Cl.$^7$ .................................... G06F 17/30
(52) U.S. Cl. .................................... 707/1; 713/2
(58) Field of Search ................. 713/2; 707/1

(56) References Cited

U.S. PATENT DOCUMENTS 6,615,365 B1 * 9/2003 Jenevein et al. ............ 714/6
6,647,508 B2 * 11/2003 Zalewski et al. ........... 714/3

* cited by examiner

Primary Examiner—Wayne Amsbury
(74) Attorney, Agent, or Firm—Duke W. Yee; Joscelyn G. Cockburn; Stephen R. Tkacs

(57) ABSTRACT

A system, apparatus and method for supporting multiple file systems in boot code of a computer. The boot code according to the present invention first identifies file systems used by a boot disk and then identifies operating systems associated with the identified file systems. Based on the identified operating systems, the boot sector for an appropriate operating system is located and loaded. Thereafter, the boot code relinquishes control to the loaded operating system. The boot code is capable of supporting multiple file systems, multiple operating systems located in a plurality of partitions of a boot disk, and multiple operating systems using the same file system.

37 Claims, 3 Drawing Sheets

SYSTEM APPARATUS AND METHOD FOR SUPPORTING MULTIPLE PARTITIONS INCLUDING MULTIPLE SYSTEMS IN BOOT CODE

RELATED APPLICATION

The present application is related to commonly assigned U.S. patent application Ser. No. 09/533,302, entitled "System, Apparatus and Method for Supporting Multiple File Systems in Boot Code," now U.S. Pat. No. 6,687,819, which is hereby incorporated by reference.

BACKGROUND OF THE INVENTION

1. Technical Field

The present invention is directed to a system, apparatus and method for supporting multiple file systems in boot code. In particular, the present invention is directed to a system, apparatus and method in which boot code of a computer performs an identification of a file system utilized by a boot disk and is capable of loading an associated operating system based on the identification of the file system.

2. Description of Related Art

With known personal computers (PCs), an operating system must be loaded by the system before file data can be accessed by the personal computer. Modern computers have programs stored in read only memory (ROM) which are retained even when power to the computer is discontinued. These programs, also known as Basic Input Output Systems (BIOS), are used to load the operating system of the personal computer. The BIOS is an essential set of routines in a PC which provides an interface between the operating system and the hardware.

On startup, the BIOS tests the system and prepares the computer for operation by querying its own small Complementary Metal Oxide Semiconductor (CMOS) memory bank for drive and other configuration settings. The BIOS searches for other BIOS's on plug-in boards and sets up pointers (interrupt vectors) in memory to access those other BIOS routines. It then loads a boot block and passes control to it.

The BIOS is capable of loading a single disk block into memory and passing control to it. This disk block is known as the boot block. A boot block is a reserved data block on a disk that is used to load the operating system. On startup, the BIOS loads the master boot record (MBR), which is in the boot block, into memory. The MBR contains pointers to the first sector, i.e. the boot sector, of the partition that contains the operating system. The boot sector contains the instructions that cause the computer to boot the operating system. The operating system is then utilized to access the computer's file system.

A file system is a collection of files, blocks, directories, and file descriptors located on one logical disk. A logical disk may be a physical disk, part of a physical disk, or several physical disks.

FIG. 1 is a generalized illustration of a file system 100 for a hard disk. As shown in FIG. 1, the file system 100 typically is comprised of a boot block 110, a file system descriptor block 120, a file descriptors block 130, a file data blocks 140. The boot block 110 has been described above.

The file system descriptor block 120 contains information identifying the total size of the file system, the size of the file descriptor block, the first free block, the location of the file descriptor of the root directory, the time the file system was created, last modified, and last used, and other system meta-data. The file descriptor block 130 contains file descriptors which are data structures maintained by the operating system that contain all the meta-data the operating system needs to record about a file. The file descriptors include such information as the last time the file was read, the last time the file was written, the length of the file, the location of the file data on the disk, the protection status of the file, and the like. The file data blocks 140 contain the actual file data.

As shown in FIG. 2, in order to access file data on a computer system, the computer's BIOS, having a BIOS loader routine 210, first loads the boot block 110. The boot block 110, i.e., the operating system loader 220, contains the MBR which points to a location for the boot sector of the operating system. The operating system loader loads the boot sector and then passes control to the operating system 230. The operating system 230 is then used to access the file data 240.

Thus, known personal computers have programs stored in ROM, i.e. BIOS, which load an operating system based on a location of the operating system boot sector identified by the master boot record. Even if the personal computer contains a hard drive having multiple partitions with multiple operating systems, the master boot record determines which operating system is loaded by identifying the boot sector of the operating system to be loaded. The partition used during booting, and thus, the operating system that is booted, may be modified by changing the BIOS to indicate a different boot partition.

In view of the above, known personal computers are limited in that they may only load an operating system that is designated as the boot operating system in the master boot record. Thus, the operating system that is to be booted must be determined prior to a boot attempt.

The above description is applicable to personal computers. Network computers differ from personal computers in that network computers do not contain a BIOS. A network computer is a desktop computer that provides connectivity to intranets and/or the Internet. It is designed as a "thin client" that downloads all applications from the network server and obtains all of its data from and stores all changes back to the server.

The network computer (NC) is similar to a diskless workstation and does not have floppy or hard disk storage. The network computer may contain a minimal amount of memory in which a boot code and an operating system may be stored. The boot code is specific to the particular operating system and is similar to the operating system loader in the BIOS of a personal computer.

When a network operator wishes to add a network computer to an existing network, the operator must first configure the network computer by loading the appropriate boot code and operating system into the network computer for the particular file system used by the network. Thus, the network computer, once configured, is only able to operate with a network using a file system that is supported by the boot code and operating system loaded into the network computer.

If the network computer is to be used with a different network file system, the boot code and operating system must be replaced with new boot code and a new operating system. Just as with the personal computer described above, the operating system that is to be loaded during a boot of the network computer must be determined prior to a boot attempt.

Thus, it would be advantageous to have a more versatile computer that is capable of determining which operating system to load at the time of a boot attempt.

SUMMARY OF THE INVENTION

The present invention provides a system, apparatus and method for supporting multiple file systems in boot code. The boot code according to the present invention searches a boot disk to determine the file systems used by the boot disk. There may be one or more file systems on the boot disk. If there are multiple file systems, there are multiple partitions of the boot disk and may be multiple operating systems corresponding to the partitions.

Once the boot code determines the file systems used on the boot disk, the boot code is able to identify corresponding operating systems for the file systems. Based on the identification of the operating systems, the boot code is able to locate a boot sector for the operating systems and load an appropriate operating system. The boot code then turns over control of the computer system resources to the loaded operating system.

In the case where there are multiple partitions and multiple operating systems, the boot code according to the present invention is capable of selecting an operating system from the multiple operating systems based on a selection criteria. In one embodiment, the selection criteria may be a priority assigned to the operating systems. In another embodiment, the selection may be based on a selection made by a user of the computer system.

In the case where there are multiple operating systems using the same file system, the present invention is capable of determining which operating system to load by analyzing a boot block of the file system to determine a corresponding operating system.

Thus, the present invention provides a system, apparatus, and method which is capable of determining an operating system to be loaded during a boot operation at the time of the boot attempt rather than prior to the boot attempt. Other features and advantages of the present invention will be described in, or will be apparent from, the following description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENTS

The present invention provides an apparatus and method in which an operating system that is to be loaded during booting of a computer is determined at the time of the boot attempt rather than prior to the boot attempt. The present invention is applicable to both personal computers and network computers. However, for descriptive purposes, only a network computer embodiment will be described herein. Those of ordinary skill in the art will readily recognize the application of the principles of the present invention to personal computers.

Figure 1:
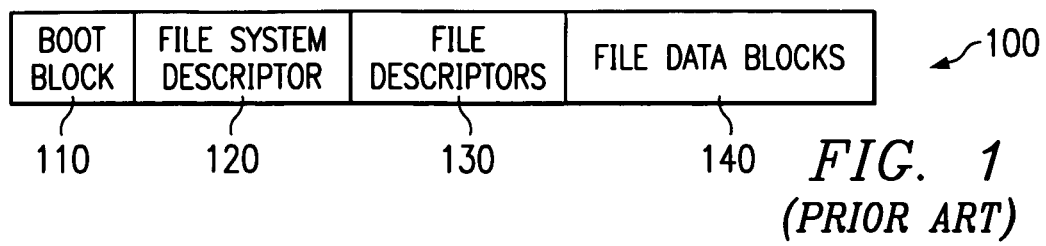
FIG. 1 is an illustration of a known file system layout.
Figure 2:
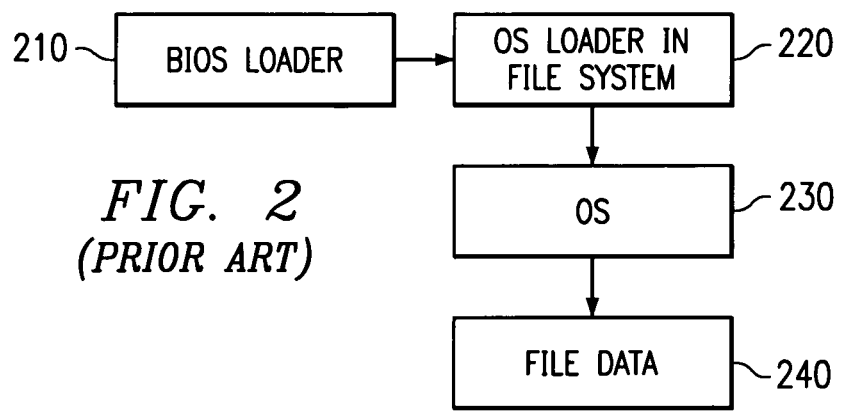
FIG. 2 is a diagram illustrating the process for loading an operating system for accessing file data.
Figure 3:
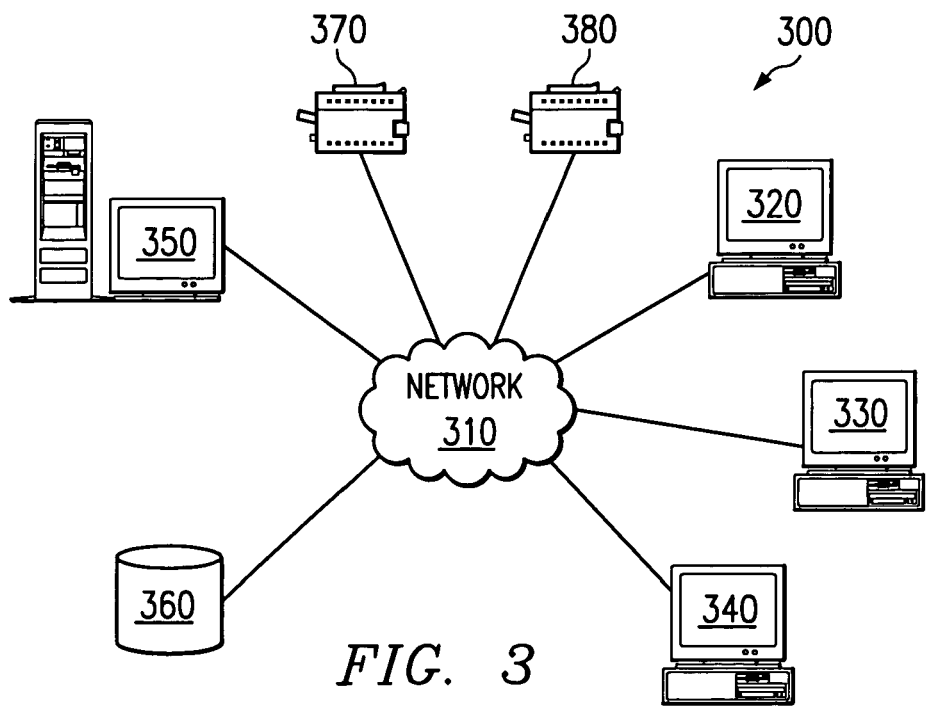
FIG. 3 is a diagram illustrating a distributed data processing system in which the present invention may be implemented.

With reference now to the figures, and in particular with reference to FIG. 3, a pictorial representation of a distributed data processing system is depicted in which the present invention may be implemented. Distributed data processing system 300 is a network of computers in which the present invention may be implemented. Distributed data processing system 300 contains network 310, which is the medium used to provide communications links between various devices and computers connected within distributed data processing system 300. Network 310 may include permanent connections, such as wire or fiber optic cables, or temporary connections made through telephone connections.

In the depicted example, server 350 is connected to network 310, along with storage unit 360. In addition, network computers 320, 330 and 340 are also connected to network 310. The storage unit 360 and printers 370–380 are depicted to represent network resources that may be accessed by the network computers 320–340 via the server 350.

For purposes of this application, a network computer is any diskless workstation coupled to a network which downloads all applications from a network server and obtains all of its data from and stores all data changes back to the network server 350. A network computer may have some capability for the addition of expansion boards such as sound cards, graphics adapters, input/output boards, and the like. This capability may be limited to reduce the cost and complexity of the network computer.

In the depicted example, server 350 provides data, such as boot files, operating system images and applications, to network computers 320–340. Network computers 320–340 are clients to server 350. Distributed data processing system 300 may include additional servers, clients, and other devices not shown. Distributed data processing system 300 also includes printer 370. Client devices, such as network computers 320–340, may print to printer 370, which is attached to server 350, or to printer 380, which is a network printer that does not require connection to a computer for printing documents. In the depicted example, distributed data processing system 300 is the Internet, with network 310 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 300 also may be implemented as a number of different types of networks such as, for example, an intranet or a local area network. FIG. 3 is intended as an example and not as an architectural limitation for the processes of the present invention.

The network computers 320–340 contain boot code that permits the network computers 320–340 to operate under a plurality of operating systems. Thus, the network computers 320–340 are generic network computers. The network computers 320–340, when booting, search the file system descriptor block of the server 350 to determine the type of file system being used by the server 350. Such determination may be based on file system identifiers that are located in the file system descriptor block from which the file system may be discerned.

Once the file system is identified, the boot code contains information for identifying an operating system associated with the file system. Based on the identification of the operating system, the boot code identifies a boot block associated with the operating system. This determination may be made by consulting, for example, correspondence information included as part of the boot code. Once the operating system and boot block are determined, the boot code loads the boot block and turns over control to the loaded operating system. Thereafter, the network computer is capable of accessing, modifying, and storing file data in the file system of the server 350.

Figure 4:
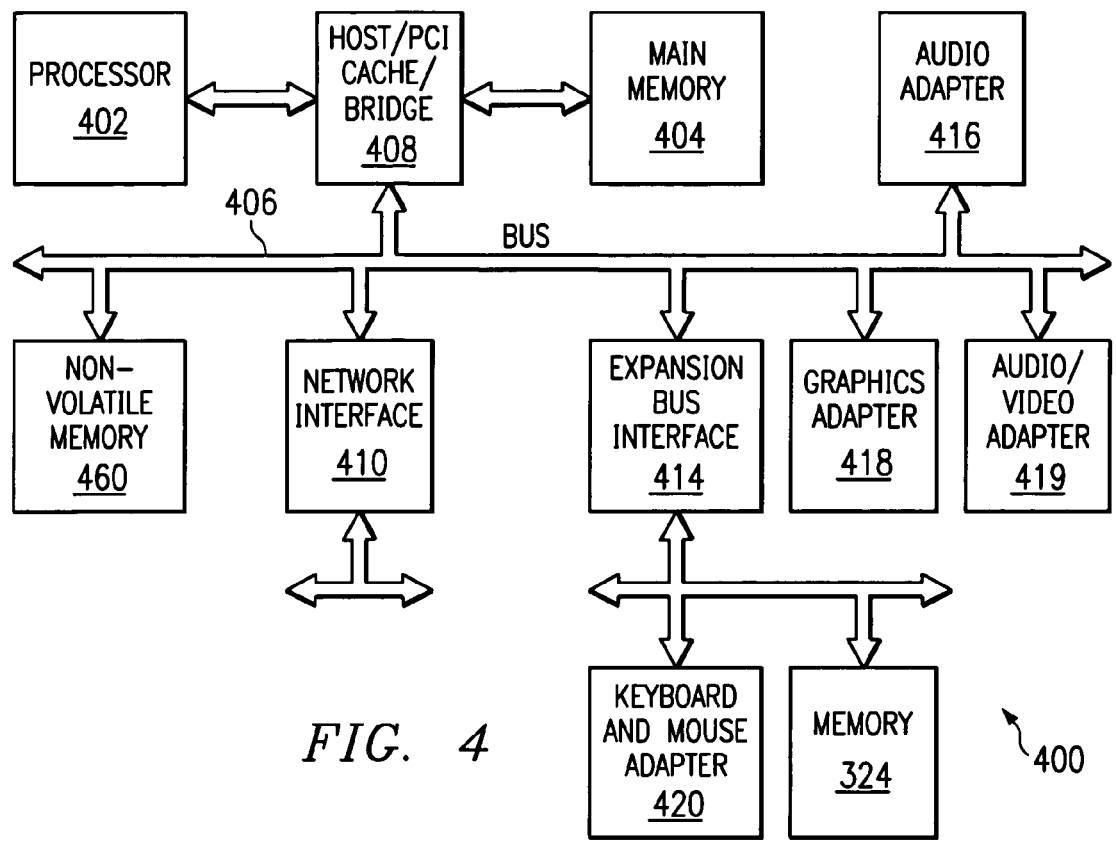
FIG. 4 is a diagram illustrating a network computer in accordance with the present invention.

With reference now to FIG. 4, a block diagram of a data processing system in which the present invention may be implemented is illustrated. Data processing system 400 is an example of a network computer, such as network computer 320. Data processing system 400 employs a peripheral component interconnect (PCI) local bus architecture. Although the depicted example employs a PCI bus, other bus architectures, such as Micro Channel and ISA, may be used. Furthermore, although a single processor data processing system is shown in FIG. 4, the invention is applicable to multiple processor systems as well as single processor systems.

Processor 402 and main memory 404 are connected to PCI local bus 406 through PCI bridge 408. PCI bridge 408 may also include an integrated memory controller and cache memory for processor 402. Additional connections to PCI local bus 406 may be made through direct component interconnection or through add-in boards. As mentioned above, the ability to proved additional connections may be limited to reduce cost and complexity of the network computer.

In the depicted example, local area network (LAN) adapter 410 and expansion bus interface 414 are connected to PCI local bus 406 by direct component connection. In contrast, audio adapter 416, graphics adapter 418, and audio/video adapter (A/V) 419 are connected to PCI local bus 406 by add-in boards inserted into expansion slots. Expansion bus interface 414 provides a connection for a keyboard and mouse adapter 420 and additional memory 424.

An operating system runs on processor 402 and is used to coordinate and provide control of various components within data processing system 400. The operating system may be a commercially available operating system, such as OS/2, which is available from International Business Machines Corporation. "OS/2" is a trademark of International Business Machines Corporation. The particular operating system that runs on the processor 402 is determined by boot code, as will be described in greater detail hereafter.

Instructions for the operating system and applications or programs are obtained from network servers via the network interface 410.

Those of ordinary skill in the art will appreciate that the hardware in FIG. 4 may vary depending on the implementation. The depicted example is not meant to imply architectural limitations with respect to the present invention.

With the present invention, non-volatile memory 460 contains boot code capable of booting a plurality of operating systems. However, the boot code according to this invention may be stored in other non-volatile memory devices, such as memory 424 or the main memory 404 without departing from the spirit and scope of the present invention. The boot code according to the present invention first identifies the file system being used by the network server with which the network computer 400 is communicating. This identification may be performed, for example, by reading a file system identifier in the file system descriptor block 120. The network computer 400 reads the file system descriptor block 120 from the network server via the network interface 410 and identifies the file system being used by the network server based on the identifier in the file system descriptor block 120.

The file system descriptor block 120 is also referred to as a file system super block. The file system super block contains information about the file system. In order to determine the file system being used, the super block is loaded by the boot code and the file system is identified by the information, such as an identifier, contained in the super block.

Based on the identification of the file system being used by the network server, the boot code identifies an operating system kernel location in a boot block of the memory 424, for example, for the operating system associated with the file system. Most operating systems used for Network computers have a preferred file system. For example FFS is the preferred file system for NetNSD, ext2FS is the preferred file system for Linux etc. Thus based on the file system it can be deteremined which operating system to load. Based on the identification of the operating system, a boot block corresponding to the operating system is identified, for example, based on information stored in the boot code. The network computer 400 then loads operating system instructions into main memory 404 and turns control over to the loaded operating system.

Because the boot code of the present invention first identifies the file system of the network server with which the network computer is communicating, and identifies a corresponding operating system, the need for multiple boot codes is eliminated. Thus, with the present invention, a network computer need not be pre-configured to be used with a particular operating system. Rather, the present invention provides a generic network computer having the boot code, according to the present invention, stored in memory thereon. The boot code allows the network computer to be used with any operating system so long as the boot code is capable of identifying the file system and a corresponding operating system used by the network servers. Thus, the boot code according to the present invention provides the capability of determining the operating system to be loaded at the time of the boot attempt and does not require that the operating system be determine a priori.

Furthermore, the present invention provides a network computer that may load different operating systems based on the file system of the particular network server with which the network computer is communicating. Thus, if the network computer of the present invention is communicating with a first network server having a FAT32 file system, the network computer will boot the Windows 98™ operating system. If the network computer then communicates with a second network server having a High Performance File System (HPFS), the network computer will boot the OS/2™ operating system. Thus, the present invention provides a network computer capable of adapting its loaded operating system to the particular file system used by the network server with which it is presently communicating.

In some cases, the same file system may be utilized by a plurality of operating systems. For example, FAT is a file system that may be used by DOS, Windows and the OS/2 operating systems. The present invention is capable of determining which of the three operating systems to load.

The boot code of the present invention first identifies the file system in the manner set forth above. Thereafter, the boot code determines that there may be multiple operating systems that use the identified file system in a manner similar to the identification of the operating system described above. The boot code then looks at the boot block of the file system on the network server to determine which operating system corresponds to the file system of the network server.

Figure 5:
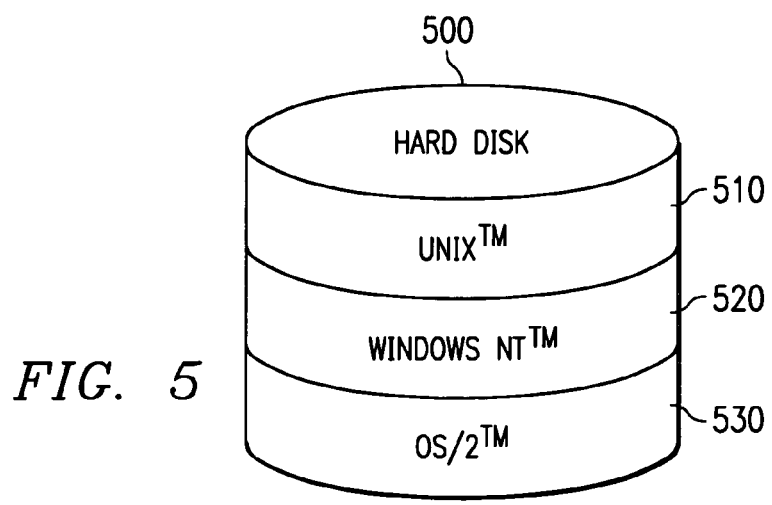
FIG. 5 is a diagram illustrating a multiple file system architecture.

In other cases, a network server may contain multiple operating systems located in multiple partitions of the network server hard disk. FIG. 5 illustrates a hard disk having three partitions 510, 520 and 530. Each partition 510–530 contains a different file system, and thus, a different operating system. Partition 510 contains a FAT32 file system and a Windows 98™ operating system. Partition 520 contains an NT File System (NTFS) and a Windows NT™ operating system. Partition 530 contains a High Performance File System (HPFS) and an OS/2™ operating system.

Figure 6:
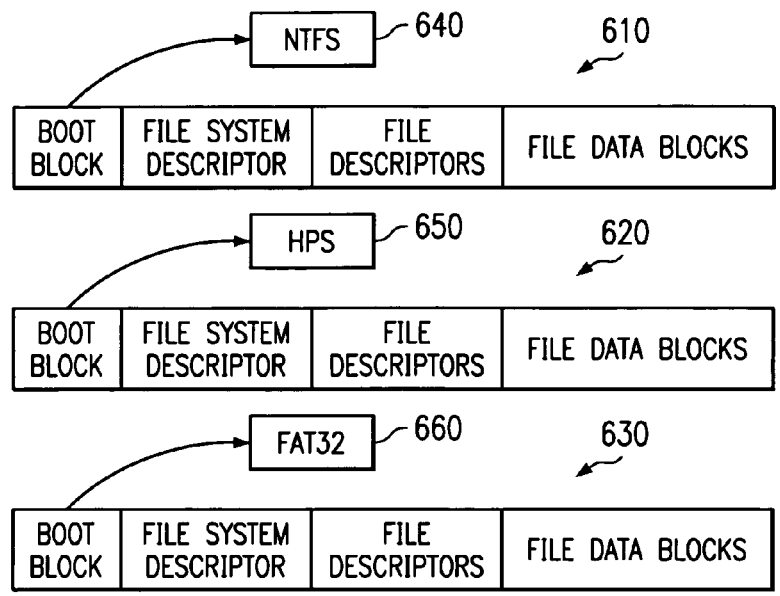
FIG. 6 is a diagram illustrating partitions of a hard drive in which each partition contains a different operating system.

In the case of multiple partitions, as shown in FIG. 6, the present invention provides a boot code that identifies the file systems 640–660 in each of the partitions 610–620. The partitions 610–620 themselves are identified based on information, such as, for example, a partition table and start and end logical sector information for each partition, stored in sector zero of the hard disk, in a manner generally known in the art. The file systems 640–660 are identified in the manner set forth above by reading file system descriptor blocks, i.e. super blocks, of each of the partitions 610–630. Once the file systems 640–660 are identified, the corresponding operating systems may be identified in a manner similar to that described above with regard to FIGS. 3 and 4.

Since only one operating system may be loaded at one time without the use of emulation, a determination must be made as to which operating system from which partition should be loaded. This determination may be made, for example, based on a prioritization scheme wherein the priorities of the various types of operating systems are stored in the boot code of the network computer. Thus, if the file system identification of each of the partitions indicates that three operating systems Windows 98™, Windows NT™ and OS/2™ are present, a prioritization scheme may indicate that Windows NT™ should be loaded. In the case of an error during loading of the operating system, the boot code may provide for loading of the next highest priority operating system.

Once it is determined which operating system is to be loaded, the boot code identifies the location of the operating system kernel, i.e. the boot sector for the operating system. The boot sector of the operating system is typically the first sector of the hard disk partition corresponding to the file system. The boot code then loads the operating system kernel and turns over control to the operating system. Thereafter, the file data of the corresponding operating system may be accessed, modified and stored.

The priorities of the operating systems may be modified by a user of the network computer such that a different operating system from a currently highest priority operating system is provided with the highest priority. The modifications to the priorities of the operating systems may be performed, for example, based on a menu provided in the boot code. The menu may be displayed to the user, in accordance with instructions stored in the boot code, to identify the possible operating systems that may be loaded. The user may then select an operating system from the displayed operating systems using an input device, such as a keyboard, mouse, or the like.

Thus, the present invention is capable of supporting multiple partitions having multiple operating systems. In addition, the present invention is capable of selecting from a plurality of possible operating systems based on a priority scheme.

Figure 7:
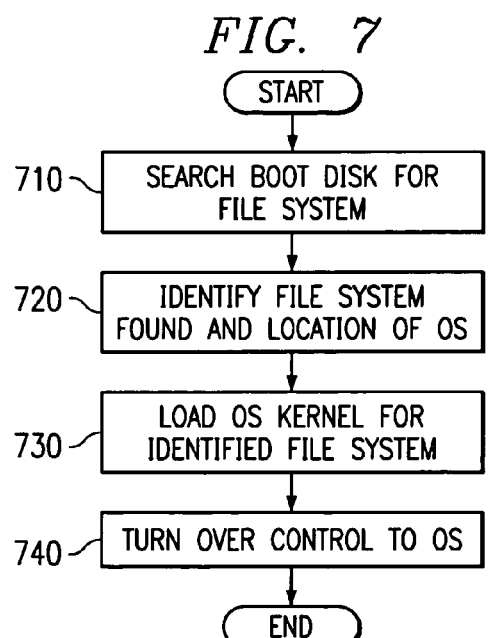
FIG. 7 is a flowchart outlining an exemplary operation of the present invention when selecting an operating system to load.

FIG. 7 is a flowchart outlining an exemplary operation of the present invention when selecting an operating system to load. As shown in FIG. 7, the operation starts with a search of the boot disk to determine the file system being used (step 710). The boot disk may be a hard disk in a personal computer, a hard disk on a server, a network computer memory, or the like, from which the operating system is to be booted.

The file system is then identified and the location of the operating system is identified based on the identification of the file system (step 720). The operating system kernel at the identified operating system location is loaded (step 730) and control is then turned over to the operating system (step 740). The operation then ends.

Figure 8:
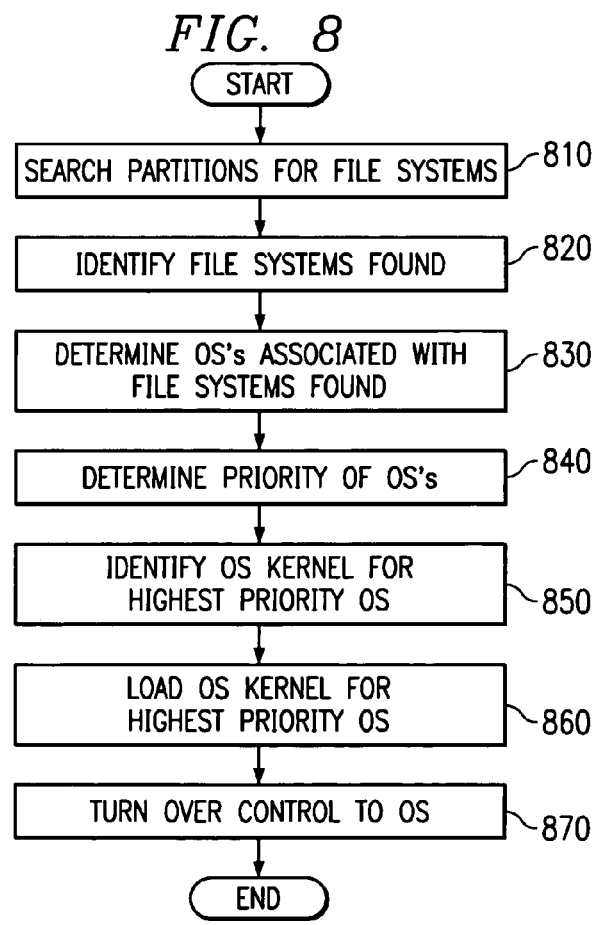
FIG. 8 is a flowchart outlining an exemplary operation of the present invention when selecting an operating system to load from a multiple partition system.

FIG. 8 is a flowchart outlining the operation of the present invention when selecting an operating system to load from a multiple partition system. A shown in FIG. 8, the operation starts with a search of each of the partitions of the system for their respective file systems (step 810). The found file systems are then identified (step 820) and the operating systems associated with the found file systems are determined (step 830).

The priority of the operating systems is then determined (step 840) and the location of the operating system kernel for the highest priority operating system is identified (step 850). The kernel for the highest priority operating system is loaded (step 860) and control is turned over to the operating system (step 870). The operation then ends.

Thus, as described above, the present invention provides a versatile computer system having a boot code capable of supporting various operating systems. The operating system that is loaded during a boot operation is determined at the time of the boot attempt rather than prior to the boot attempt. The determination is based primarily on the file system used by the boot disk. The boot disk may be located on the computer system having the boot code or may be on a remote computer, such as a network server.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, CD-ROMs, and transmission-type media such as digital and analog communications links.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for loading an operating system, comprising:
    searching, by a boot code, a set of partitions of a storage device for file systems resulting in found file systems;
    identifying, by the boot code, a plurality of operating systems associated with the found file systems, each one of the file systems being associated with one or more of the plurality of operating systems;
    selecting, by the boot code, one operating system of the plurality of operating systems, wherein selecting one operating system of the plurality of operating systems includes determining priorities of the plurality of operating systems and selecting an operating system having a highest priority; and
    loading, by the boot code, operating system instructions of the selected one operating system.

2. The method of claim 1, further comprising:
    identifying each of the found file systems, wherein each of the found file systems are identified by loading a file system descriptor block associated with each of the found file systems.

3. The method of claim 1, wherein identifying a plurality of operating systems associated with the found file systems includes identifying a preferred operating system for each found file system based on file system information in a file system descriptor block for each of the found file systems.

4. The method of claim 1, wherein identifying a plurality of operating systems includes identifying a boot sector on the storage device associated with an identified operating system for each of the plurality of operating systems.

5. The method of claim 1, wherein loading operating system instructions includes loading an operating system kernel in a boot sector of the storage device.

6. The method of claim 1, wherein the method is implemented in a network computer.

7. The method of claim 1, wherein identifying a plurality of operating systems associated with the found file systems includes identifying a second plurality of operating systems corresponding to one file system of the found file systems and selecting one of the second plurality of operating systems as an operating system associated with the one file system.

8. The method of claim 7, wherein selecting one of the second plurality of operating systems includes looking at a boot block of the one file system and selecting an operating system from the second plurality of operating systems based on information in the boot block of the one file system.

9. The method of claim 1, wherein the method is implemented by a network computer and wherein the plurality of file systems are located on a network server.

10. The method of claim 1, wherein the method is implemented in a personal computer and wherein the storage device is one of a hard disk, a floppy disk, and an optical disk accessed by the personal computer.

11. The method of claim 1, wherein the priorities of the plurality of operating systems are modifiable by a user.

12. The method of claim 1, wherein the priorities of the plurality of operating systems are modifiable by a user via a menu.

13. A data processing apparatus for loading an operating system, comprising:
    a processor unit; and
    a first storage device coupled to the processor unit, the first storage device storing boot code that is executed by the processor unit to perform the functions;
    identifying a plurality of file systems on a second storage device, each one of the plurality of file systems being associated with a partition of the second storage device;
    identifying a plurality of operating systems associated with the plurality of file systems, each one of the plurality of file systems being associated with one or more of the plurality of operating systems;
    selecting one operating system of the plurality of operating systems, wherein selecting one operating system of the plurality of operating systems includes determining priorities of the plurality of operating systems and selecting an operating system having a highest priority; and
    loading operating system instructions of the selected one operating system.

14. The apparatus of claim 13, wherein the plurality of file systems are identified by loading a file system descriptor block associated with each one of the file systems.

15. The apparatus of claim 13, wherein identifying a plurality of operating systems associated with the plurality of file systems includes identifying a preferred operating systems based on file system information in a file system descriptor block for each one of the plurality of file systems.

16. The apparatus of claim 13, wherein identifying a plurality of operating systems includes identifying a boot sector on the storage device associated with an identified operating system for each of the plurality of operating systems.

17. The apparatus of claim 13, wherein loading operating system instructions includes loading an operating system kernel in a boot sector of the storage device.

18. The apparatus of claim 13, wherein the data processing apparatus is a network computer.

19. The apparatus of claim 13, wherein identifying a plurality of operating systems associated with the plurality of file systems includes identifying a second plurality of operating systems corresponding to one file system of the plurality of file systems and selecting one of the second plurality of operating systems as an operating system associated with the one file system.

20. The apparatus of claim 19, wherein selecting one of the second plurality of operating systems includes looking at a boot block of the one file system and selecting an operating system from the second plurality of operating systems based on information in the boot block of the one file system.

21. The apparatus of claim 13, wherein the data processing apparatus is a network computer and wherein the plurality of file systems are located on a network server.

22. The apparatus of claim 13, wherein the data processing apparatus is implemented in a personal computer and wherein the second storage device is one of a hard disk, a floppy disk, and an optical disk accessed by the personal computer.

23. The apparatus of claim 13, wherein the priorities of the plurality of operating systems are modifiable by a user.

24. The apparatus of claim 13, wherein the priorities of the plurality of operating systems are modifiable by a user via a menu.

25. The apparatus of claim 13, wherein the processor unit includes at least one processor.

26. A computer program product, in a computer readable medium, for loading an operating system, comprising:
   first instructions for identifying a plurality of file systems on a storage device, each one of the plurality of file systems being associated with a partition of the storage device;
   second instructions for identifying a plurality of operating systems associated with the plurality of file systems, each one of the plurality of file systems being associated with one or more of the plurality of operating systems;
   third instructions for selecting one operating system of the plurality of operating systems, wherein the third instructions include instructions for determining priorities of the plurality of operating systems and selecting an operating system having a highest priority; and
   fourth instructions for loading operating system instructions of the selected one operating system.

27. The computer program product of claim 26, wherein the first instructions include instructions for loading a file system descriptor block associated with each one of the file systems.

28. The computer program product of claim 26, wherein the second instructions include instructions for identifying a preferred operating systems based on file system information in a file system descriptor block for each one of the plurality of file systems.

29. The computer program product of claim 26, wherein the second instructions include instructions for identifying a boot sector on the storage device associated with an identified operating system for each of the plurality of operating systems.

30. The computer program product of claim 26, wherein the fourth instructions include instructions for loading an operating system kernel in a boot sector of the storage device.

31. The computer program product of claim 26, wherein the second instructions include instructions for identifying a second plurality of operating systems corresponding to one file system of the plurality of file systems and selecting one of the second plurality of operating systems as an operating system associated with the one file system.

32. The computer program product of claim 31, wherein the instructions for selecting one of the second plurality of operating systems include instructions for looking at a boot block of the one file system and selecting an operating system from the second plurality of operating systems based on information in the boot block of the one file system.

33. The computer program product of claim 26, wherein the priorities of the plurality of operating systems are modifiable by a user.

34. The computer program product of claim 26, wherein the priorities of the plurality of operating systems are modifiable by a user via a menu.

35. A data processing system for loading an operating system, comprising:
   first identifying means for identifying a plurality of file systems on a storage device, each one of the plurality of file systems being associated with a partition of the storage device;
   second identifying means for identifying a plurality of operating systems associated with the plurality of file systems, each one of the plurality of file systems being associated with one or more of the plurality of operating systems;
   selecting means for selecting one operating system of the plurality of operating systems, wherein the selecting means includes priority means for determining priorities of the plurality of operating systems and selecting an operating system having a highest priority; and
   loading means for loading operating system instructions of the selected one operating system.

36. The data processing system of claim 35, wherein the priorities of the plurality of operating systems are modifiable by a user.

37. The data processing system of claim 35, wherein the priorities of the plurality of operating systems are modifiable by a user via a menu.

* * * * *